United States Patent [19]
Rosen

[11] Patent Number: 4,949,922
[45] Date of Patent: Aug. 21, 1990

[54] SATELLITE CONTROL SYSTEM

[75] Inventor: Harold A. Rosen, Santa Monica, Calif.

[73] Assignee: Hughes Aircraft Company, Los Angeles, Calif.

[21] Appl. No.: 282,015

[22] Filed: Dec. 9, 1988

[51] Int. Cl.⁵ .............................................. B64G 1/36
[52] U.S. Cl. .................................... 244/168; 244/164; 244/173
[58] Field of Search ................... 244/158 R, 164, 168, 244/173

[56] References Cited
U.S. PATENT DOCUMENTS 3,304,028  2/1967  Dryden ............................. 244/168
4,262,867  4/1981  Diening ............................ 244/173
4,325,124  4/1982  Renner ............................. 244/173

FOREIGN PATENT DOCUMENTS 2531547  2/1984  France ............................. 244/168

Primary Examiner—Joseph F. Peters, Jr.
Assistant Examiner—Anne Sartelle
Attorney, Agent, or Firm—Steven M. Mitchell; Wanda Denson-Low

[57] ABSTRACT

A method for achieving satellite (24) attitude stabilization against the undesired influences of solar pressure or other attitude disturbances to be used with earth-orbiting satellites of the type employing two solar collection panels (30a), (30b) extending from the satellite body in generally opposite directions (36), (38). Synchronized simultaneous movement of both solar panels about their normal sun-tracking position causes desirable torques to be generated which have a cancelling influence on the undesired satellite movement caused by solar pressure or other attitude disturbances.

25 Claims, 6 Drawing Sheets

SATELLITE CONTROL SYSTEM

BACKGROUND OF THE INVENTION

The present invention relates to satellite attitude control, and, more particularly to a method of compensating for the undesired effects of solar pressure or the like on the attitude of earth orbiting satellites.

It is generally desirable in communication satellite applications, to fix a satellite's position and orientation (attitude) with respect to certain celestial bodies. For example, in satellite communication applications it is common to position the satellite in a geostationary orbit around the earth while continuously orienting the satellite's solar collectors toward the sun and orienting the satellite's communications antennas toward the earth. This arrangement has the advantages of permitting multiple ground stations to continually use the satellite without interruption while the satellite gains the maximum benefit from the solar energy incident to its solar collectors.

The position and orientation of a satellite in a geostationary orbit must be occasionally adjusted because forces resulting from solar pressure, oblateness of the earth, and solar and lunar gravitational perturbations eventually alter the satellite's position and orientation beyond acceptable limits.

Several techniques have been developed for compensating for the disturbing effects on satellites. For example, gas powered thrusters can be briefly fired to return the satellite to its proper position and orientation whenever it deviates therefrom. While this method works well when relatively large infrequent corrective maneuvers are needed, such as northsouth stationkeeping, it is costly and inconvenient to frequently correct for smaller attitude disturbances, such as those created by solar pressure on the satellite's solar collectors.

Another technique which is frequently used to control a satellite's attitude employs the use of an on-board momentum wheel. Such wheels are usable in two modes—in a fixed orientation relative to the satellite, or on a gimballed platform. With a fixed momentum wheel, the satellite attitude errors are periodic when the external moments are periodic. The peak attitude errors are inversely proportional to the angular momentum of the wheel and directly proportional to the magnitude of the external moments. When there is a component of the external moment that has a fixed direction in space, or rotates with a yearly rather than a dialy period, the attitude errors will increase with time until they reach an unacceptable limit. At this point the attitude control thrusters must be employed to return the satellite's attitude within its desired range. In a typical satellite design, this use of the thrusters for attitude control is much more frequent than for orbit control, even though the fuel required for attitude control is relatively small.

With a gimballed momentum wheel, the satellite attitude errors due to external moments may be kept nulled even in the presence of external moments. This is accomplished by counteracting the external moments by the moments generated by gimballing the wheel, under the supervision of the attitude control system. For periodic external moments, the gimbal angles are periodic and their peak values are inversely proportional to the angular momentum of the wheel. A component of external moment that has a fixed direction in space or a yearly period will cause the gimbal angles to grow with time and eventually reach their limits. Before this occurs, the spacecraft thrusters must be employed to exert external moments which, by action of the spacecraft's attitude control system, return the momentum wheel gimbals to their desired operating range. This use of the thrusters for attitude control is much more frequent than for orbit control in a typical design, if no other means of obtaining control moments is available.

Still other techniques are used to generate control moments. One such technique is the use of magnetically induced torques to react against the earth's magnetic field. This method works reasonably well, but is subject to the vagaries of the earth's magnetic field at geosynchronous altitude. Another method is solar sailing, in which the solar radiation pressure reacting on the solar panels is used to create the desired compensating moments. The control moments generated by solar sailing are obtained by deviating the orientation of at least one of the satellite's solar panels slightly from the normal sun tracking position. When two panels are controlled in a coordinated motion, precise attitude control is possible in the fixed momentum wheel system. In the gimballed momentum wheel system, the amount of gimbal travel required for control may be substantially reduced. In both systems, the use of thrusters for attitude control is eliminated, except for the infrequent periods when they are used for orbit control. Solar sailing not only saves the fuel used to effect attitude control, but also enhances the reliability of the satellite, since the possibility of loss of control due to inadvertent firing of the trusters is minimized by locking out the thrusters during most of the mission.

The largest source of long period external disturbing moments is that produced when the center of solar radiation pressure does not coincide with the center of mass of the satellite, since this moment is fixed relative to the earth's sun line.

The general concept of single panel solar sailing is disclosed in U.S. Pat. No. 4,325,124, issued to Renner and entitled "System For Controlling the Direction of the Momentum Vector of a Geosynchronous Satellite." The Renner patent discloses a system for solar sailing wherein, depending on the direction of the disturbance torque, one solar collection array is rotated while the other panel remains in its normal sun tracking position. While the use of the Renner method does provide for some degree of satellite attitude control using solar sailing techniques, undesirably high windmill torques are induced on the satellite by virtue of rotating only one panel at a time. These undesired windmill torques inherently limit the overall attitude accuracy which can be attained when using the single-panel solar sailing technique for a fixed momentum wheel system, or result in excessive gimbal travel in a gimballed momentum wheel system.

Accordingly, it is a primary object of the present invention to provide a method for coordinated simultaneous rotation of both solar collection panels of a satellite to reduce the undesirable destabilizing effects of solar pressure and the like on a satellite's attitude.

Another object of the present invention is to provide a method of solar sailing as described above wherein satellite attitude is controlled without resort to the use of thrusters.

Another object of the present invention is to improve the attitude accuracy obtainable with a fixed wheel attitude control system.

Still another object of the present invention is to provide a method of solar sailing as described above which reduces the total gimbal travel of a gimbal-mounted momentum wheel used to compensate for the disturbing torques and thereby increase the useful life of the momentum wheel gimbal mechanisms.

Still another object of the present invention is to reduce the peak gimbal motion required of the gimbal mechanism, thereby simplifying its design.

SUMMARY OF THE INVENTION

Accordingly, the present invention provides a method for compensating for the undesired torque applied to a satellite by solar pressure or other external disturbing moments where the satellite is of the stabilized type including first and second solar collection panels rotatable about a common axis so as to normally position the panels to track the sun, where the panels extend in generally opposite directions away from the body of the satellite. The method generally comprises the steps of: (A) determining the magnitude and direction of the undesired torque applied to the satellite due to solar pressure or the like; and (B) applying a compensating torque to the satellite to correct for the effects of the undesirable torque on the satellite by essentially simultaneously rotating the first and second panels in the same direction about a common axis from a normal sun tracking position to respectively first and second compensating positions angularly offset from the normal sun tracking position and angularly offset from each other. The panels are preferably rotated at essentially the same rate. After prescribed periods of time, the first and second panels are then rotated respectively to third and fourth compensating positions by essentially simultaneously rotating the panels in the opposite direction about the common axis from the first and second compensating positions past the normal sun tracking position, wherein the third and fourth compensations positions are angularly offset from each other. The magnitude and direction of the undesired torque applied to the satellite is preferably determined by sensing the roll and pitch of the satellite produced by such torque.

BRIEF DESCRIPTION OF THE DRAWINGS

In the accompanying drawings where the like numerals refer to similar components in the various embodiments and figures.

DESCRIPTION OF THE PREFERRED EMBODIMENTS

Figure 1:
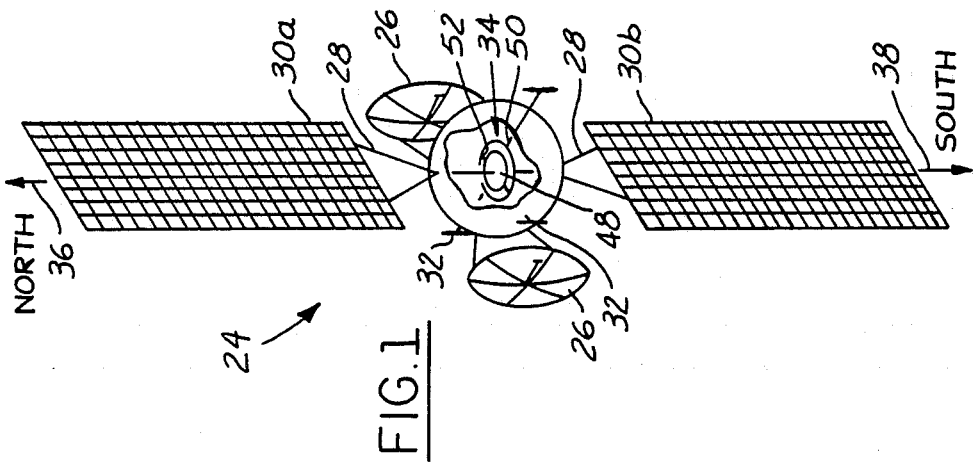
FIG. 1 is a perspective diagrammatic view of a satellite having a pair of sun-tracking solar collection panels suitable for practicing the preferred form of the method of the present invention.

In accordance with the present invention, a typical satellite 24 is shown in FIG. 1 having communication antennas 26, two solar collection panels 30a, 30b, thrusters 32, and a two-axis gimballed momentum wheel 34. The solar collection panels 30 extend in generally opposite directions away from each other and are maintained in a northern and southern orientation 36, 38 respectively. Each panel 30 is mounted to the satellite 24, by means of a strut 28, for rotation about a common axis. Attitude stabilization of the satellite 24 is achieved by means of a momentum wheel 48 of the conventional type which may include gimbal mounting thereof with respect to two axes 50, 52. The use of two-axis gimbal wheel mounting of the momentum wheel 48 provides high-precision attitude control which allows compensation for externally applied, disturbing torques, simply by altering the attitude of the momentum wheel about either or both of the two axes and/or changing the rotational speed of the wheel.

Figure 3:
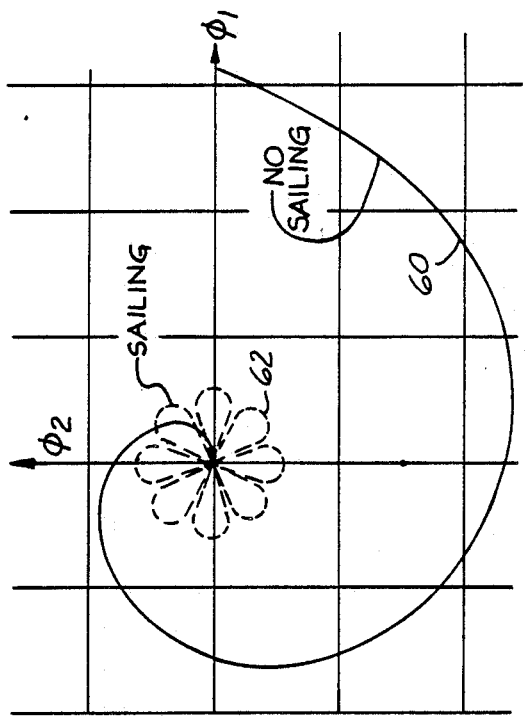
FIG. 3 is a graph showing the disturbance caused to a satellite or its momentum wheel when solar sailing is used and when solar sailing is not used.
Figure 4:
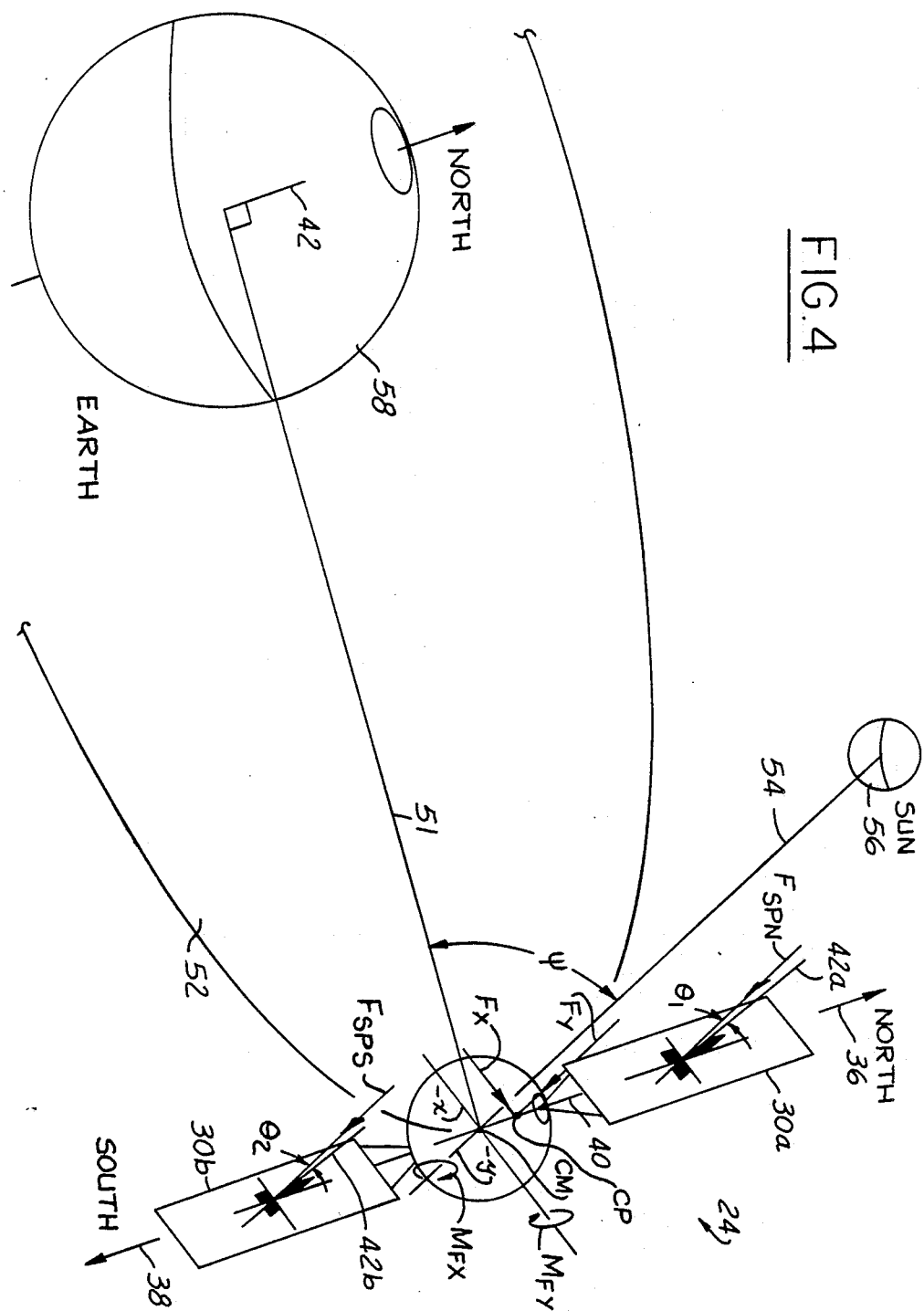
FIG. 4 is a diagrammatic perspective view showing the satellite of FIG. 1 in geosynchronous orbit around the earth as well as the associated vector forces acting on the satellite due to solar pressure.

Referring now also to FIG. 4, the central axis 40 of the satellite 24 extends generally parallel to the earth's rotation axis 42. Forces due to solar pressure bearing on the northern solar panel 30a are grouped together and designated as $F_{SPN}$ while forces due to solar pressure on the southern solar panel 30b are shown as the vector $F_{SPS}$. If the satellite solar panels were to remain perfectly rigid, the center of pressure CP caused by solar radiation would generally coincide with the satellite's center of mass CM and no net torque would be imparted to the satellite due to solar pressure. However, thermally induced bending of the solar panels causes their center of pressure to shift typically in a north-south direction; this is especially true during or near the summer and winter solstices. Station keeping fuel consumption over the life of the satellite can also cause a displacement between the satellite's CP and CM. Additionally, there is some initial uncertainty as to the exact location of the satellite's CP and the CM. The solar radiation torque resulting from such displacement has a constant direction relative to the sun. In the absence of compensating attitude control, this solar pressure would introduce attitude errors or gimbal angle motion as depicted by the spiral 60 in FIG. 3.

Figure 2:
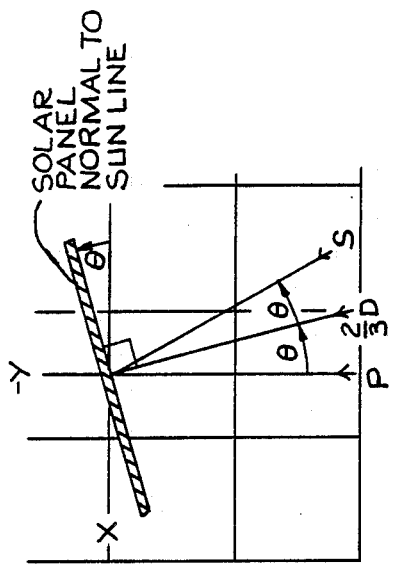
FIG. 2 is a top view of one of the solar collectors of the satellite shown in FIG. 1 and diagrammatically depicting the associated components of solar pressure which normally act thereon.

The forces on each of the solar panels 30a, 30b produced by solar radiation pressure can be resolved into components produced by absorption (P), diffuse reflection ($\frac{2}{3}$D) and specular reflection (S) of the incident solar radiation. The vector diagram of FIG. 2 shows these component forces associated with solar radiation pressure. The diffuse reflection component is only two-thirds effective because of its broad angular dispersion. It is convenient to resolve these components into the orthogonal set $F_x$ and $F_y$, where:

$$F_y = -\left(P + \frac{2}{3}D \cdot \cos\theta + S \cdot \cos 2\theta\right) \cos \cdot \theta$$

$$\simeq -\left(P + \frac{2}{3}D + S\right) + \left(P + \frac{4}{3}D + 5S\right)\theta^2$$

$$F_x = \left(\frac{2}{3}D \sin\theta + S \cdot \sin 2\theta\right) \cdot \cos\theta$$

$$\simeq \left(\frac{2}{3}D + 2S\right)\theta$$

As shown in FIG. 4, the two forces, $F_y$ and $F_x$, act at the center of pressure CP. The force Fy produces a torque in the equatorial plane 52 perpendicular to the sun line 54; this torque is shown as $M_{FY}$. The force $F_x$ produces a torque along the sun line 54 which extends between the center of mass CM of the satellite 24 and the center of the sun 56; this torque is designated as $M_{FX}$. Both of these torques are proportional to the distance between the center of pressure CP of the satellite and the satellite's center of mass CM. The torque exerted by Fy is called the roll torque (R) and the torque exerted by Fx if called the windmill torque (W). The R torque and W torque can be related to the solar panel angles by the following formulas:

$$R = a(\theta_1^2 - \theta_2^2) \quad (1)$$

$$W = b(\theta_1 - \theta_2) \quad (2)$$

where $\theta_1$ is the angle formed between a normal line drawn to the plane of the northern solar panel 30a and the vector $F_{SPN}$ and $\theta_2$ is the angle formed between a normal line drawn to the plane of the southern solar panel 30b and the vector $F_{SPS}$, and a and b are constants determined by the geometry of the solar cell optical properties.

Solving equations (1) and (2) for $\theta_1$ and $\theta_2$ gives:

$$2\theta_1 = (b R/a W) + W/b \quad (4)$$

$$2\theta_2 = (b R/a W) - W/b \quad (5)$$

Referring now to FIGS. 1, 3 and 4, displacement of the center of radiation pressure CP from the center of mass CM in the north-south direction along axis 40 by a distance d creates a R torque of magnitude 2Fyd. The R torque direction is fixed relative to the sun 56, but with respect to the earth 58 it rotates at one revolution per day in earth oriented spacecraft coordinates. The attitude control system of the satellite 24 maintains correct attitude by shifting the gimbals of the momentum wheel 48 in opposition to the external R torque. The locus of the momentum wheel gimbal angles during the course of one day, in the absence of solar panel compensation, is shown by the solid line 60 in FIG. 3. The curve 60 is an Archimedean spiral whose radius increases uniformly with time. The equation for the spiral is $r = k\psi$, and its length is:

$$L = k/2[\psi(1+\psi^2)^{\frac{1}{2}} + \ln(\psi + (1+\psi^2)^{\frac{1}{2}})]$$

which for large angles is approximated by:

$$L = (k/2)\psi^2$$

Here $\psi$ is the angle between the sun and the earth, or $\omega_e t$, where $\omega_e$ is the earth's rotational rate of $7.27 \times 10^{-5}$ rad/sec and t is time in seconds. The gimbal angles $\theta_1$ and $\theta_2$ are $k\psi \cos \psi$ and $k\psi \sin \psi$ respectively. In the absence of any other torque control, attitude control thrusters must be used periodically to return the gimbal angles to their center positions.

In accordance with the method of the present invention, dynamic solar panel orientation can be used instead of thrusters to keep the gimbal angles within a desired range. If each solar panel is caused to rotate in a common direction away from its normal sun-tracking position and then rotated in a common opposite direction, a net torque can be developed which effectively stabilizes the attitude of the satellite, thereby correcting for much of the attitude disturbance which would otherwise have to be corrected for by the gimballed momentum wheel or thrusters.

Figure 5:
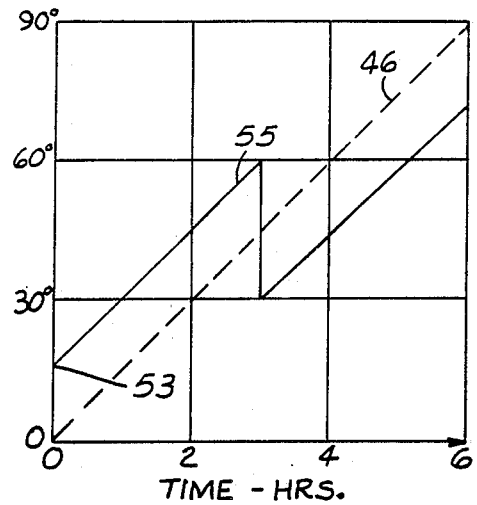
FIG. 5 is a graph showing the relative movement of one of the solar panels with respect to the spacecraft when the panel is rotated at a high rotational rate in performing the method of the present invention.
Figure 6:
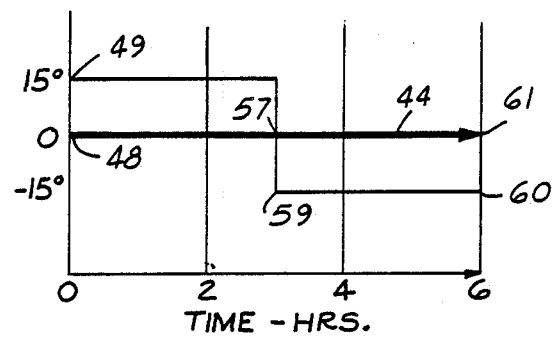
FIG. 6 is a graph showing the same panel rotation rate as that of FIG. 5, but viewed relative to the sun.

Attention is now directed to FIGS. 4, 5, and 6 which will be used to explain the movements of a single solar panel when solar sailing is not used and when solar sailing is used. In most satellites of the type shown in FIG. 1, the solar panels serve one primary purpose, which is to convert solar power into electrical power. In order to maximize the percentage of solar energy that is converted to electrical energy, the solar panels track the sun at all times. A solar panel tracks the sun by keeping the normal to its plane 42a pointing directly at the sun 56. In FIG. 6, this conventional suntracking methodology is shown by straight line 44. Dashed line 46 of FIG. 5 shows the same angular information as that of line 44, but with respect to a spacecraft reference. As was stated earlier, when implementing the disclosed method, the solar panels do not directly track the sun, but rather track it at compensating positions which are angularly offset from the normal suntracking position and also from each other. Focusing on the movements of one of the two solar panels when used to practice the present invention, FIG. 6 shows at time (t)=zero 48, the solar panel is rotated from its normal tracking position 48 and placed at a 15 degree incline 49 to the sun 56 (i.e. $\theta = 15$ degrees). At this 15 degree angle to the sun, the plane of the solar panel would intersect the earthbound reference line 51 at 15 degrees if $\psi$ is 90 degrees. This 15 degree offset with respect to the earthbound reference line is shown as 53 in FIG. 5. As the time progresses from t=0 48 to the halfway point, t=3 hrs. 57, the panel is swept so as to keep $\theta$ as the initial offset angle of 15 degrees 49 to the sun. This is seen from an earthbound reference as a constant panel rotation of 15 degrees per hour 55. At the end of the first half of the cycle period 57, the solar panel is rotated in the opposite direction and placed at an equal and opposite angular compensating position 59 to that which is occupied during the first half of the cycle period. The panel remains at this second offset position for the remainder of the cycle period 60 and then returns to its normal sun-tracking position 61. The major consideration in determining the necessary amount of panel offset is the desired magnitude of the control moment—a large panel offset gives rise to a large control moment.

Figure 7:
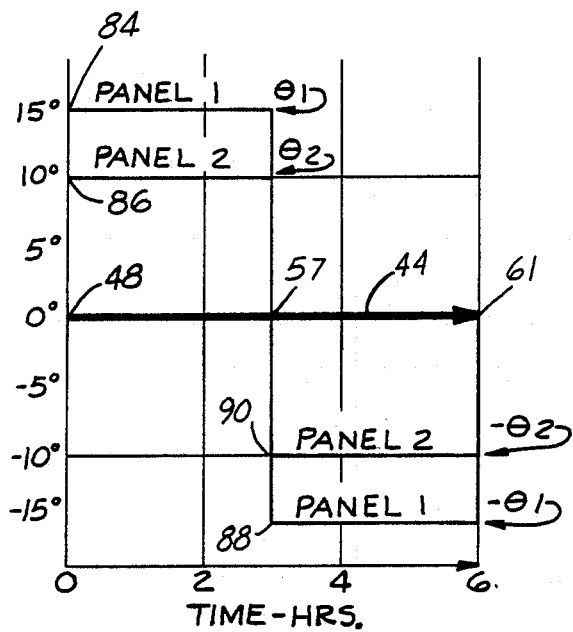
FIG. 7 is a graph showing the relative positioning of both solar collector panels, viewed from the sun over a six hour period when both are rotated at high rotational rates while performing the method of the present invention.

FIGS. 5 and 6 have been used to show how one solar panel would be used during the course of implementing single panel solar sailing. FIG. 7 shows the angular relationship of two solar panels as they are rotated over one cycle period of double-panel solar sailing. Referring now to FIG. 7, at t=0 indicated at 48, panel 1 is rotated in a first direction through an angle $\theta_1$ and placed at a first compensating position 84, where $\theta_1 = 15$ degrees. Also at t=0 indicated at 48, panel 2 is rotated in a first direction through an angle $\theta_2$ and placed at a second compensating position 86, where $\theta_2 = 10$ degrees. Both panels remain at these respective offset positions until half of the cycle period has lapsed indicated at 57, at which time they are rotated in a direction opposite to the first direction until each is placed in a symmetrically complementary position referenced from the normal tracking position: i.e., $\theta_1 = -15$ degrees and $\theta_2 = -10$ degrees shown at 88 and 90 respectively. Both panels remain in these positions for the duration of the second half of the cycle period. Upon completion of the second half of the cycle period, both panels are rotated back to the normal sun-tracking position 61.

When the panels are moved in the manner depicted in FIG. 7, two torque components are created, a W torque component and an R torque component. Since the W torque is the torque created by the collective offsets of panel 1 and panel 2 about the time axis 44, it can be seen that over one cycle period the net W torque componet is zero. Even though the net W torque component is zero, the instantaneous W torque component is not zero, and since the momentum wheel responds to instantaneous torque and not average torque, over a 24-hour period the alternating W torque component causes the momentum wheel gimbal angles to describe the path shown by the dashed line 62 in FIG. 3. The angles $\theta_1$ and $\theta_2$ are chosen so that the R torque generated by double-panel solar sailing cancels the effects of the R torque caused by solar pressure or the like while minimizing the undesired instantaneous W torque. If the ratio of the second panel angle ($\theta_2$) to the first ($\theta_1$) is designated by the constant C, then equations (1) and (2) yield:

$$R = a(\theta_1^2 - \theta_2^2) = a\theta_1^2(1 - C^2)$$

$$W = b(\theta_1 - \theta_2) = b\theta_1(1 - C)$$

and combining equations (1) and (2) to eliminate $\theta_1$:

$$W = b(R/a)^{\frac{1}{2}}((1-C)/(1+C))^{\frac{1}{2}} \qquad (6)$$

Figure 8:
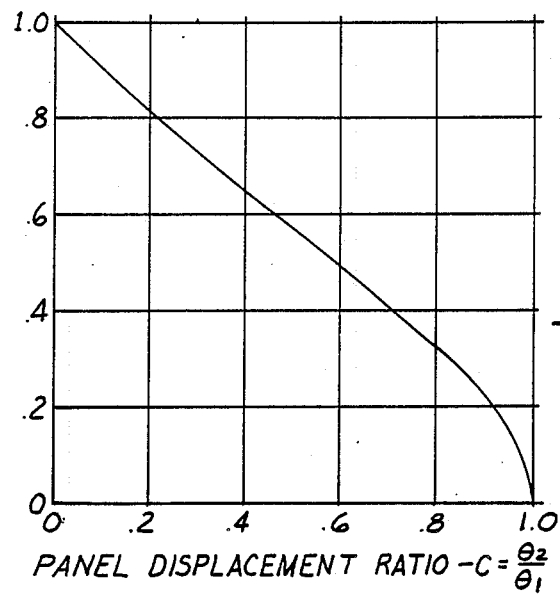
FIG. 8 is a graph showing the reduction of relative gimbal travel or attitude error as a function of the panel displacement ratios of a satellite using the present invention.

Equation (6) indicates that if the ratio of $\theta_2$ to $\theta_1$ remains fixed, then the gimbal motion due to the windmill torque W is thus reduced, by virtue of the second panel motion, by the factor $((1-C)/(1+C))^{\frac{1}{2}}$. This factor is plotted in FIG. 8. Since $\theta_1$ must be increased as C is increased to provide the required R torque, eventually the reduction in available solar power, which varies as $\cos\theta$, limits the value of C which can be used. As a practical matter, a reduction of a factor of three is currently believed to be reasonable, which corresponds to a value of 0.8 for C.

In practice, the square-like panel movements depicted in FIGS. 5, 6 and 7 require very high rates, so much so that panel movements of this nature may not be easily accomplished. Panel movements as depicted in trapezoidal plots shown in FIGS. 9, 10 and 11 avoid the problems associated with such square-like panel movements and are therefore preferred. Thus, in the following, a preferred method of trapezoidal-like panel movements is disclosed.

Figure 9:
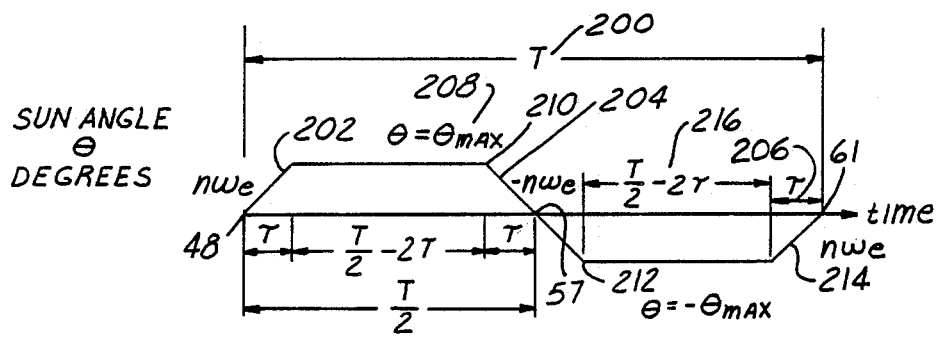
FIG. 9 is a graph showing the same panel rotation rate as that of FIG. 10, but viewed relative to the sun.

The solar panel rates and angles for a generalized trapezoidal panel waveform relative to the sun are shown in FIG. 9, for a panel period T hours 200 and panel rates (relative to the sun) of $n\omega_e$ 202 and $-n\omega_e$ 204 during the transitions. The time $\tau$ 206 is chosen to give the desired panel displacement angle $\theta_{max}$ 208. $\theta_{max}$ is equal to $n\omega_e\tau$. The multiple of the earth rate at which the panel transitions, n, determines how long during the period 200 the solar panel dwells at its maximum displacement angle $\theta_{max}$ 208. Since the spacecraft is earth oriented and therefore turns at the earth rate $\omega_e$, the panel angles relative to the spacecraft are equal to the sun references angles increased by $\omega_e T$. The solar panel rates relative to the spacecraft are therefore the sun referenced rates increased by $\omega_e$.

When implementing trapezoidal-like panel movements as distinguished from square-like panel movements, the primary difference is in the time required for a panel to be rotated to its compensating position. In square-like panel movements, the time elapsed from the normal sun-tracking position to the compensating position is very small, whereas this time lapse when making trapezoidal-like panel movements is not small and corresponds to a preferred rate of two to four times $\omega_e$. FIG. 9 depicts the trapezoidaltype panel movements made by a solar panel (panel 1) in carrying out the method of the present invention. At t=0 indicated at 48, panel 1 is rotated from its normal sun-tracking position of $\theta = 0$ degrees to a first compensating position of $\theta = \theta_{max}$ 208. This rotation takes place over a time span of $\tau$ seconds at a panel rotation rate of $n\omega_e$ shown at 202. Panel 1 is kept at this $\theta_{max}$ compensating position 208 for T/2 $-2\tau$ seconds which dictates that it rotates at $\omega_e$. Once T/2 $-2\tau$ seconds has lapsed 210, panel 1 is rotated from a first compensating position $(\theta = \theta_{max})$ 210 to a second compensating position $(\theta = -\theta_{max})$ 212, at a rotational rate of $-n\omega_e$ 204. Panel 1 goes on to complete its cycle period of T seconds 61 by remaining at the second compensating position for T/2 $-2\tau$ seconds 216 and then rotating at the rate of $n\omega_e$ 214 for $\tau$ seconds. The important characteristics of this waveform for control purposes are its mean square value, which relates to the R torque, and its mean value for a half period, which relates to the W torque. These are given as a function of the parameter $\tau$ as follows:

$$\overline{\theta^2} = (1-(8\tau/3T))\theta^2_{max}$$

$$\overline{\theta} = (1-(2\tau/T))\theta_{max}$$

$$\theta_{max} = n\omega_e T$$

Figure 10:
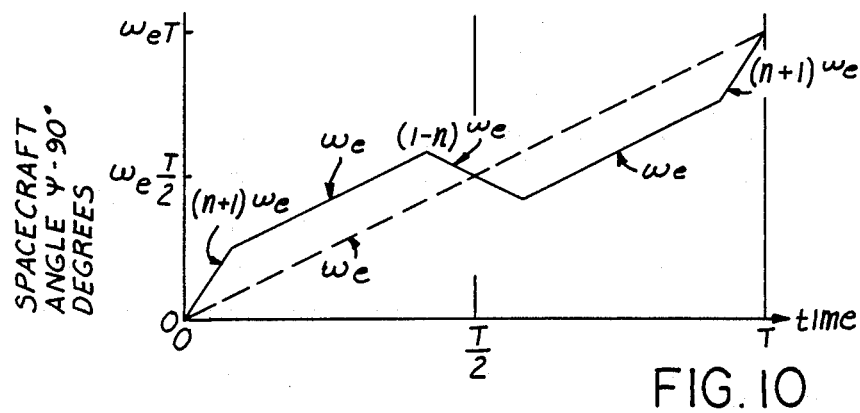
FIG. 10 is a graph showing the relative movement of one of the solar panels with respect to a satellite-bound reference when the panel is rotated at a trapezoidal rate while performing the method of the present invention.
Figure 11:
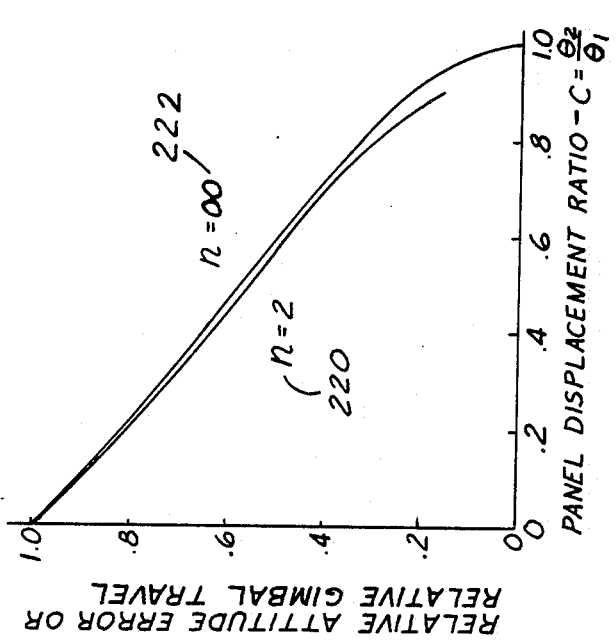
FIG. 11 is a graph showing the decrease in daily gimbal travel that is obtained as a function of panel displacement ratio C for a trapezoidal waveform with a n=2 and n=infinity (square waveform).

FIG. 10 shows solar panel movement identical to that of FIG. 9 but as it would be viewed from a spacecraft reference. It is evident that for n greater than unity, backtracking occurs during the mid period transition. This increases the total panel motion during the period beyond that required to track the sun when no tracking is employed, and hence results in an increase in the wear of the panel mechanism. The ratio of the total motion with and without tacking is:

| | n | r |
|---|---|---|
| r = 1 + (4(n − 1)τ/T) | 1 | 1 |
| or, equivalently | 2 | 1 + 2 $\theta_{max}/\omega_e T$ |
| | 4 | 1 + 3 $\theta_{max}/\omega_e T$ |
| r = 1 + [4(n − 1)$\theta_{max}/n\omega_e T$] | ∞ | 1 + 4 $\theta_{max}/\omega_e T$ |

These results imply that low values of n are desirable in order to minimize total solar panel travel. However, with low values of n, the average control moment is reduced since the dwell time at the maximum displacement angle is reduced.

The dwell time (i.e. [T/2]−2τ) at the displacement angle $\theta_{max}$ is T/2(1−4$\theta_{max}$/n$\omega_e$T), and the ratio of the dwell time to the half period T/2 is d=(1−(4$\theta_{max}$/n$\omega_e$T)). For a panel displacement angle $\theta_{max}$ of 15 degrees, the following table applies:

| | T = 2 hr. | | T = 4 hr. | | T = 6 hr. | | T = 12 hr. | |
|---|---|---|---|---|---|---|---|---|
| n | r | d | r | d | r | d | r | d |
| 1 | 1.00 | — | 1.00 | 0 | 1.00 | .33 | 1.00 | .67 |
| 2 | 2.00 | 0 | 1.50 | .50 | 1.33 | .67 | 1.17 | .83 |
| 4 | 2.50 | .50 | 1.75 | .75 | 1.50 | .83 | 1.25 | .92 |
| ∞ | 3.00 | 1.00 | 2.00 | 1.00 | 1.67 | 1.00 | 1.33 | 1.00 |

It can be seen that higher values of n result in greater dwell times and hence greater maximum controllability.

The reduction in attitude error or in gimbal travel for double-panel solar sailing which uses generalized trapezoidal panel movements, is not only a function of C, the panel displacement ratio, but also of the desired R torque, the transition rate ratio n, and the period T, and must be computed for each specific case. For all cases of practical interest, however, the improvement as a function of C is very nearly the same as for the square wave motion, which corresponds to n=∞. An illustrative case is plotted in FIG. 11, for n=2 shown at 220, a control torque R of 9×10⁻⁶ lb.-ft., and a period of six hours. It can be seen that the improvement factor is slightly more favorable than for the square waveform 222.

Figure 12A:
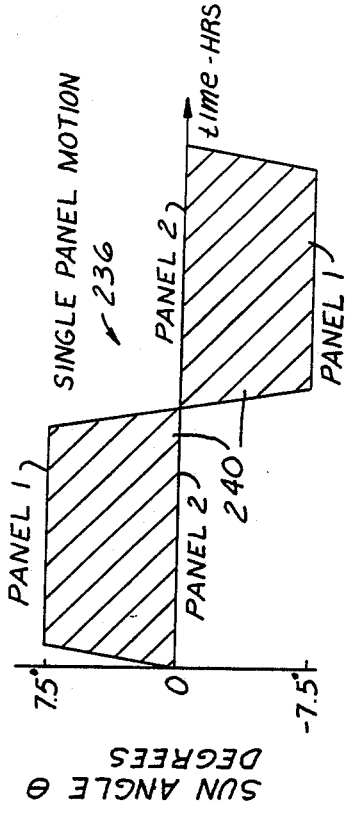
FIG. 12A is a graph showing the movements of both solar panels when performing single panel solar sailing.
Figure 12B:
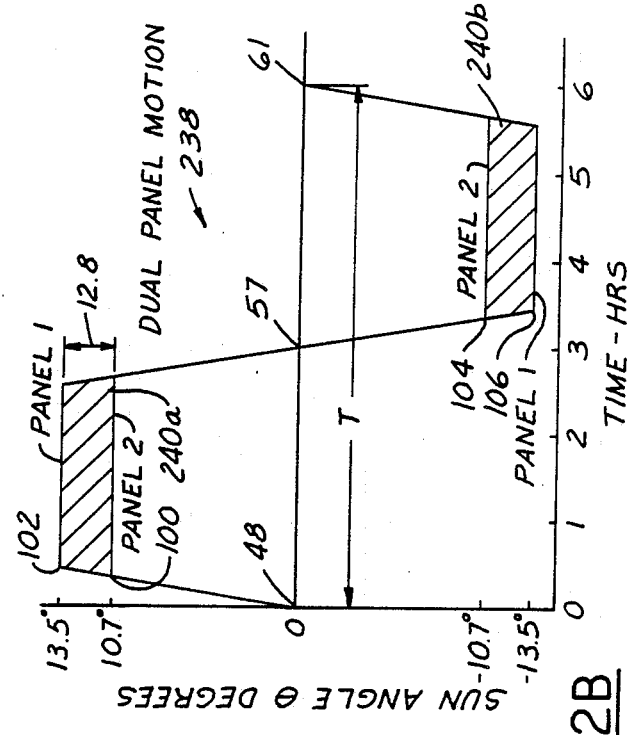
FIG. 12B is a graph showing the movements of both solar panels when performing double panel solar sailing.

This improvement factor can be better understood by referring to FIGS. 12A and 12B. In this illustration, single panel motion 236 is compared to dual panel motion 238, for the same R control torque requirement. Whereas both methods resist the same R torque, the undesired W torque, which is proportional to the area between the panel 1 and panel 2 curves 240, is three times as great for the single panel motion 236 as for the dual panel motion 238. Thus, the attitude errors or gimbal motion is reduced by a factor of three for this dual panel case 238. If some average W torque is desired when using double panel solar sailing 238, it can be achieved by making the cross hatched areas 240a and 240b unequal.

FIG. 12B shows the trapezoidal movements of panel 1 as they are depicted in FIG. 9 and the trapezoidal movements of panel 2 as they exist when employing a preferred method of the present invention. FIG. 12B shows both panels being rotated from the normal sun-tracking position 48 to a first compensating position 102 for panel 1 and a second compensating position 102 for panel 2. The first and second panels are kept at their respective compensating positions which remain fixed with respect to the sun and remain at a fixed offset 128 with respect to each other. After the appropriate time has elapsed, the panels are rotated through the sun line 57 and positioned in compensating positions 104, 106 which are the complement of those positions 100, 102 established during the first half of the cycle period. The panels remain in their respective complementary compensating positions until they are rotated back to the normal sun-tracking position 61. The cycle period T of the plot of FIG. 12B can be optimized for a given set of undesired torques. Once the optimal cycle period is determined, the maximum number of complete cycles, or segments, which can be executed during one complete satellite orbit around the earth is equal to twenty-four divided by the optimum cycle time. The segments generally may range in number from one to one hundred with a preferred segment range from two to ten. A segment number of four (which equates to a 6 hour cycle period) works well for a wide range of conditions. In selecting the optimum value of all the parameters, consideration must be given to solar panel excess travel as well as attitude errors to gimbal travel. For the case of the gimballed momentum wheel, a relatively long period T may be selected, since only the peak gimbal angle is affected and not the total gimbal travel. The longer the period, the smaller the value of excess solar panel travel. For the case of a fixed momentum wheel, a shorter period should generally be selected in order to minimize the attitude errors.

For the spacecraft 24 shown in FIGS. 1 and 4, having an 80 foot span and typical solar cells in the panels 30a, 30b, $$a = 530 \times 10^{-6} \text{ lb.-ft.}$$

$$b = 200 \times 10^{-6} \text{ lb.-ft.}$$

A CP-CM offset in the north-south direction results in a torque of $$R = 4.5 \times 10^{-6} \text{ lb.-ft. per inch.}$$

Figure 13:
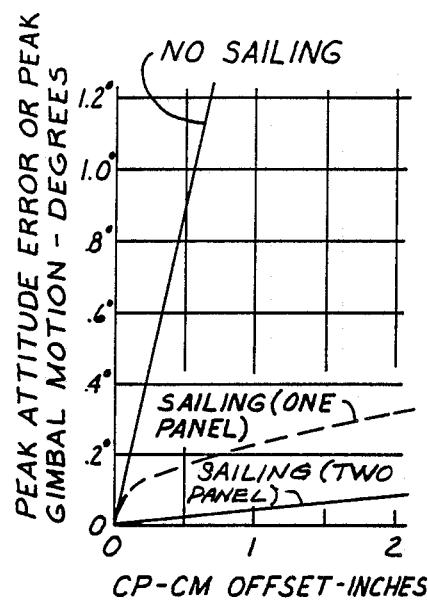
FIG. 13 is a graph showing the peak gimbal motion in three different satellite attitude control systems, no solar sailing, one panel solar sailing, and two panel solar sailing, respectively, as a function of the offset between the center of mass CM and the center of pressure CP.
Figure 14:
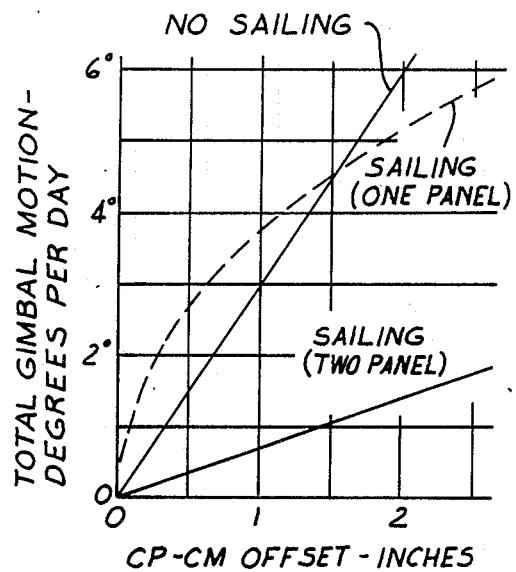
FIG. 14 is a graph showing the total daily gimbal motion in degrees of three different satellite attitude control systems, no solar sailing, one panel solar sailing, and two panel solar sailing, respectively, as a function of the offset between the center of mass CM and the center of pressure CP.

A momentum wheel momentum of 25 ft.-lb. sec. was used to calculate the gimbal travel, using the relationship $$G = Wt/H \text{ (gimbal travel in radians)}$$

where W is the average windmill torque, t is the time (86,400 seconds for daily travel calculations), and H is the momentum wheel angular momentum. The attitude errors for a fixed wheel system are equal to the gimbal angles of the gimballed wheel system. The reduction in gimbal travel or attitude error is further demonstrated by the curves shown in FIGS. 13 and 14, which depict the total and peak daily gimbal travel which occurs without sailing, with single panel sailing, and with the coordinated double-panel sailing of the present invention for practical values of C. Since the useful life of the gimbal mechanisms is related to the daily travel, double-panel sailing substantially increases the useful life of the gimbals. For systems employing fixed gimbal movements, double-panel solar sailing substantially reduces the satellite's attitude errors.

To summarize, the method of the present invention broadly includes the steps of: (A) determining the magnitude and direction of the undesired torque applied to the satellite, and (B) applying a compensating torque to the satellite in order to compensate for the effects of the undesired torque applied to the satellite by solar pressure or the like, by simultaneously rotating the first and second panels in a first direction about a common axis from the normal sun tracking position thereof to respectively first and second compensating positions which are angularly offset from the normal sun tracking position. The method further includes the steps of rotating the first and second panels respectively from their first and second compensating positions, past their normal sun tracking position in the opposite direction of rotation about the common axis to respective third and fourth compensating positions. The first and second compensating positions are angularly offset from each other and, likewise the third and fourth compensations positions are angularly offset from each other and are complimentary to the first and second compensation positions relative to the normal sun tracking positions.

Figure 15:
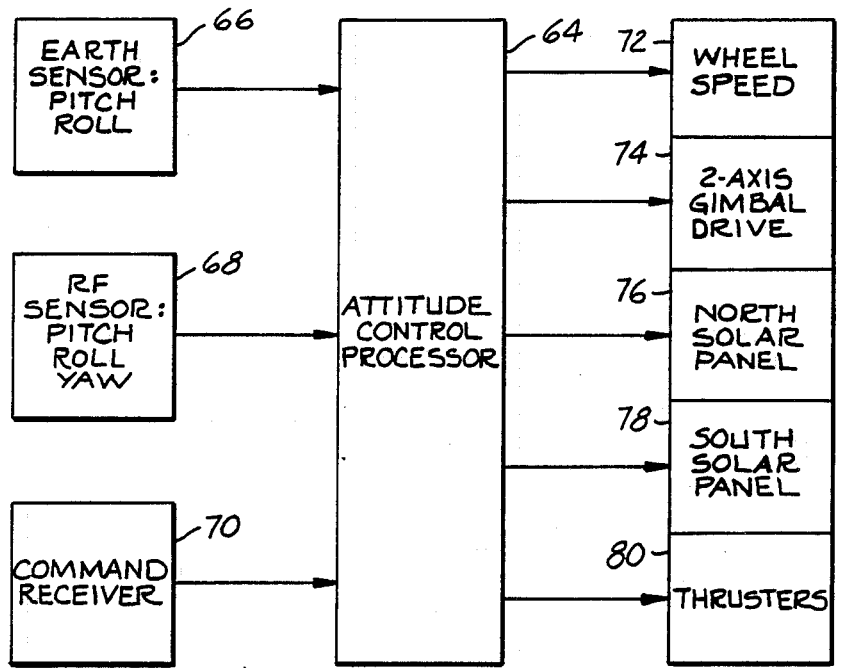
FIG. 15 is a block diagram of an attitude control system for the satellite of FIG. 1, which is suitable for use in carrying out the method of the present invention.

Attention is now directed to FIG. 15 wherein a modern attitude control system is depicted which is suitable for use in practicing the method of the invention. The control system includes an attitude control processor 64 which is a programmable digital processor. The processor 64 normally receives information regarding pitch and roll of the satellite 24 from an earth sensor 66. However, in those applications requiring greater precision, an RF sensor 68 provides the processor with data regarding the pitch and roll of satellite 24. A command receiver 70 on-board the satellite 24 receives commands originating from earth related to commanded changes in attitude and provides these to the processor 64.

The processor 64 processes the data received from the sensors 66, 68 and command receiver 70 in accordance with programmed instructions and provides output signals to various means for correcting the attitude of the satellite 24. Specifically, the processor 64 provides signals to a wheel speed controller 72 which controls the speed of the momentum wheel 48. Similarly, the processor 64 provides control signals to the two-axis gimbal drives 74 for altering the orientation of the momentum wheel 48 about two axes. Controllable motors 76, 78 for independently controlling the rotation of the north and south solar panels respectively likewise receive control signals from the processor 64. Finally, the processor 64 also provides signals to the thrusters 80 in order to effect attitude control.

Using programmed algorithms designed to minimize attitude errors, the processor 64 generates signals that control rotation of the solar panels 30a, 30b so as to produce the relative rotations over time as plotted in FIG. 12. The parameters $\tau$ and C can be computed internally or, alternately, on the ground and transmitted via the command system. The outputs to the thrusters 80 are required for attitude control only during infrequent stationkeeping maneuvers and are shown merely for completeness.

Because the double panel solar sailing process as herein disclosed is controlled by a processor 64, the period T and panel rotation rates $n\omega_e$ can be changed from time to time to adapt to unforeseen or unpredictable circumstances. The generalized trapezoidal panel movements as outlined in FIG. 9, along with the information disclosed herein may be used to implement a flexible control strategy for double panel solar sailing which is capable of adapting to a large variety of applications and conditions, even after the satellite is deployed.

From the foregoing, it may be appreciated that a novel method for satellite attitude control is provided which not only provides for accomplishing the objects of the invention, but does so in a particularly effective and reliable manner. It is recognized that those skilled in the art may make various modifications or additions to the preferred embodiment chosen to illustrate the invention without departing from the spirit and scope of the present contribution to the art. Accordingly, it is to be understood that the protection sought out to be afforded hereby should be deemed to extend to the subject matter claimed and all equivalents thereof fairly within the scope of the invention.

I claim:

1. For use with a satellite of the type including first and second solar collection panels rotatable about a common axis to a position normally tracking the sun, said panels extending in generally opposite directions away from the body of said satellite, a method for compensating for the effects of undesired torque applied to said satellite, comprising the steps of:
    (A) determining the magnitude and direction of undesired torque applied to said satellite; and
    (B) applying a compensating torque to said satellite to compensate for the effects of said undesired torque on said satellite by essentially simultaneously rotating said first and second panels in a first common direction about said common axis from said normal sun tracking position to respectively first and second compensating positions angularly offset from said normal sun tracking position.

2. The method of claim 1, wherein step (B) is performed by rotating said first and second panels at generally the same rate.

3. The method of claim 1, wherein step (A) is performed by sensing the roll and pitch of said satellite produced by said undesired torque.

4. The method of claim 1, further comprising the step of rotating said first and second panels to respectively third and fourth compensating positions by essentially simultaneously rotating said panels in a second common direction about said common axis from said first and second compensating positions, said second rotational direction being opposite to said first rotational direction and said third and fourth compensating positions being angularly offset from said normal sun tracking position.

5. The method of claim 1, wherein said first and third compensating positions are offset from said normal sun tracking position by $\theta_1$ and $-\theta_1$ degrees respectively, and said second and fourth compensating positions are offset from said normal sun tracking position by $\theta_2$ and $-\theta_2$ degrees respectively.

6. The method of claim 4, wherein said first and third compensating positions are angularly offset about said common axis from said normal sun tracking position equal but opposite amounts, and said second and fourth compensating positions are angularly offset about said common axis from said normal sun tracking position equal but opposite amounts.

7. The method of claim 1, wherein said first and second compensating positions are angularly offset from each other about said common axis.

8. The method of claim 2, wherein said first and second compensating positions are angularly offset from each other about said common axis.

9. The method of claim 3, wherein said first and second compensating positions are angularly offset from each other about said common axis.

10. The method of claim 4, wherein said first and second compensating positions are angularly offset from each other about said common axis.

11. The method of claim 5, wherein said first and second compensating positions are angularly offset from each other about said common axis.

12. The method of claim 10, wherein said third and fourth compensating positions are angularly offset from each other about said common axis.

13. The method of claim 4, further comprising the step of essentially simultaneously rotating said first and second panels from their respective said third and fourth compensating positions to said normal sun tracking position.

14. The method of claim 1, further comprising the step of essentially simultaneously rotating said first and second panels from their respective said first and second compensating positions to said normal sun tracking position.

15. The method of claim 1, wherein said steps (A) and (B) are performed periodically throughout the course of the orbit of said satellite around the earth.

16. A method for compensating for the undesired torque applied to an earth orbiting satellite by solar pressure or the like, wherein said torque produces undesired windmill and roll motions of said satellite, said satellite being of the type including first and second solar collection panels rotatable about a common axis so as to normally track the sun, comprising the steps of:
(A) resolving said undesired torque into a vector quantity having a first vector component which urges said satellite to roll and a second vector component which urges said satellite to windmill;
(B) rotating essentially simultaneously said first and second panels in the same direction about said common axis from said normal sun tracking position respectively to a first compensation position and a second compensating position;
(C) rotating essentially simultaneously said first and second panels in the same direction about said common axis respectively from said first and second compensating position to third and fourth compensating positions, said first and third compensating positions being offset from said normal tracking position by $\theta_1$ and $-\theta_1$ degrees respectively, and said second and fourth compensating positions being offset from said normal tracking position by $\theta_2$ and $-\theta_2$ degrees respectively; and
(D) rotating essentially simultaneously said first and second panels about said common axis from their respective said third and fourth compensating positions to said normal tracking position; whereby the orientation of said first and second panels produced by the rotation carried out in steps (B) through (D) compensates for the effects of undesired satellite roll and windmill motions produced by said solar pressure.

17. The method of claim 16, wherein said first and second compensating positions are angularly offset from each other about said common axis.

18. The method of claim 16, wherein steps (B), (C) and (D) are each performed by rotating said first and second panels at essentially the same rate.

19. The method of claim 16, wherein said steps (A) through (D) are performed periodically throughout the course of the orbit of said satellite.

20. The method of claim 16, wherein step (A) includes using roll and pitch sensors aboard said satellite to determine magnitude and direction of said first vector component which urges said satellite to roll and determine magnitude and direction of said second vector component which urges said satellite to windmill.

21. A method for compensating for the undesired torque applied to an earth orbiting satellite by solar pressure, wherein said undesired torque includes undesired windmill and roll torque components urging said satellite to deviate from its prescribed attitude, said satellite being of the type including first and second solar collection panels rotatable about a common axis so as to normally track the sun, comprising the steps of:
(A) dividing into segments the orbital path of said earth orbiting satellite;
(B) determining the duration that said satellite will reside each of said segments;
(C) determining the magnitude and direction of said undesired solar windmill torque and magnitude and direction of said undesired solar roll torque which will urge said satellite to deviate from said prescribed attitude during the duration of each of said segments;
(D) rotating essentially simultaneously said first and second panels about said common axis, said first panel being rotated from said normal sun tracking position to a first compensating position and said second panel being rotated from said normal tracking position to a second compensating position;
(E) rotating essentially simultaneously said first and second panels about said common axis, said first panel being rotated from said first compensating position to a third compensating position and said second panel being rotated from said second compensating position to a fourth compensating position; and
(F) rotating essentially simultaneously said first and second panels about said common axis from their respective said third and fourth compensating positions to said sun tracking position;
the rotating of said first and second panel in steps (D) through (F) producing a desired roll and windmill torque which are equal in magnitude but opposite in direction respectively to said undesired windmill and roll torques.

22. The method of claim 21, wherein step (C) includes using roll and pitch sensors aboard said satellite to determine magnitude and direction of said undesired solar windmill torque and magnitude and direction of said undesired solar roll torque.

23. The method of claim 21, wherein said segments range in number from one to one hundred.

24. The method of claim 21, wherein said steps (D) through (F) are conducted during each of said segments of said orbit of said earth orbiting satellite.

25. The method of claim 21, wherein said panels are rotated at rates between $1/10\omega_e$ and $10\omega_e$, where $\omega_e$ is the angular velocity of the earth.

* * * * *